April 3, 1956     F. JOHANNSEN     2,740,710
METHOD FOR THE PRODUCTION OF IRON, NICKEL, COBALT, MANGANESE
AND CHROMIUM FROM THEIR ORES
Filed Feb. 19, 1952     3 Sheets-Sheet 1
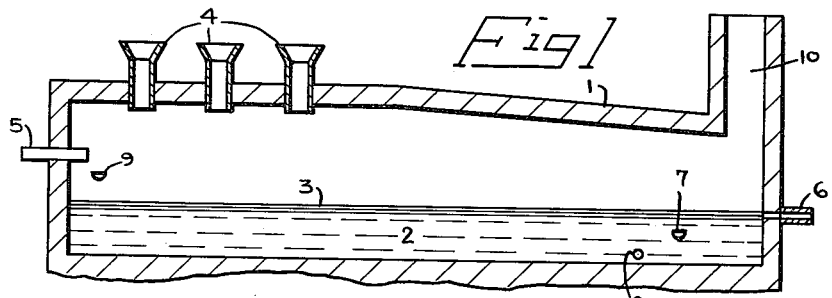
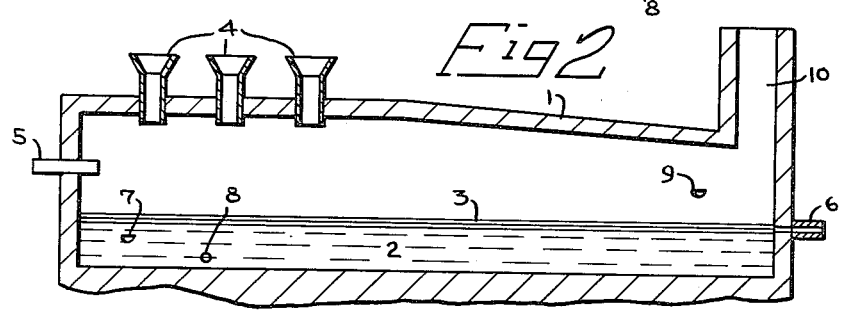
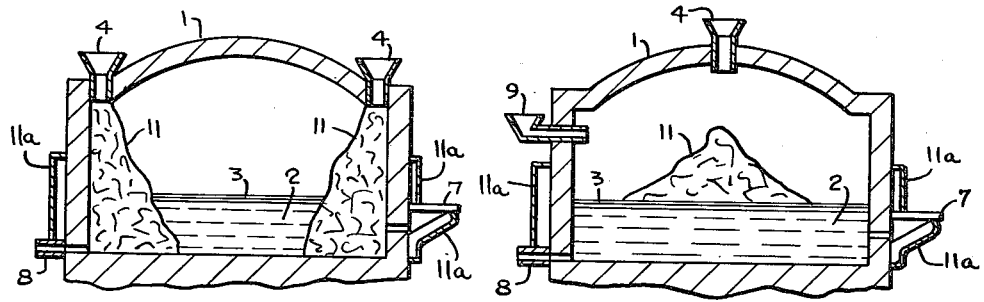
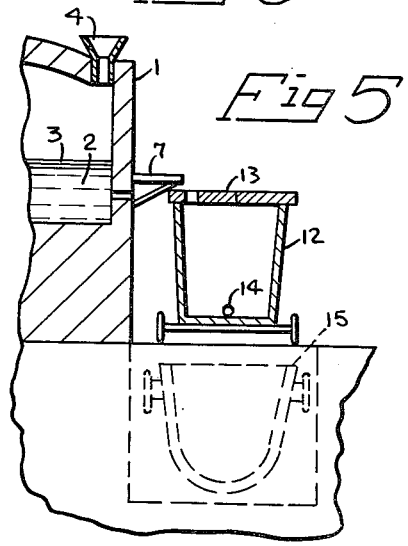
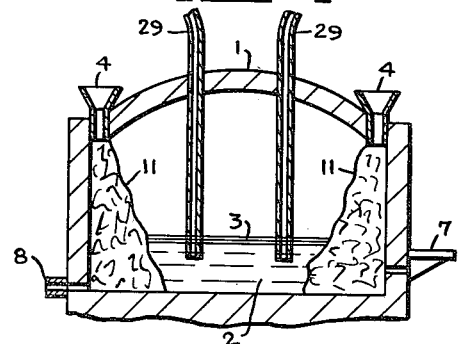
INVENTOR.
FRIEDRICH JOHANNSEN
BY
ATTORNEY April 3, 1956  F. JOHANNSEN  2,740,710
METHOD FOR THE PRODUCTION OF IRON, NICKEL, COBALT, MANGANESE
AND CHROMIUM FROM THEIR ORES
Filed Feb. 19, 1952  3 Sheets-Sheet 2
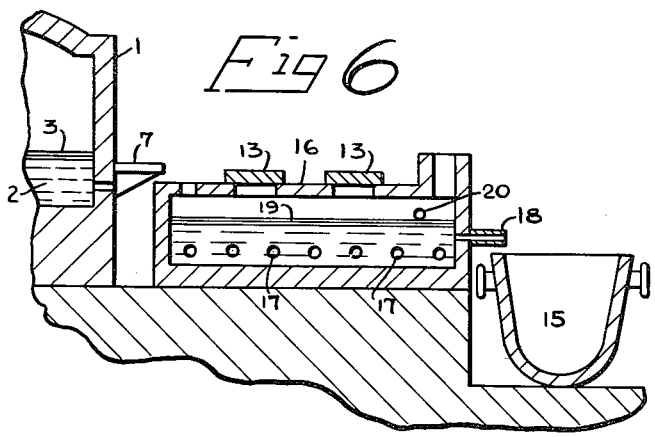
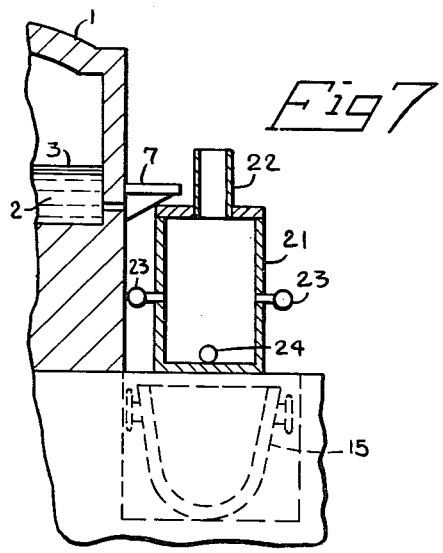
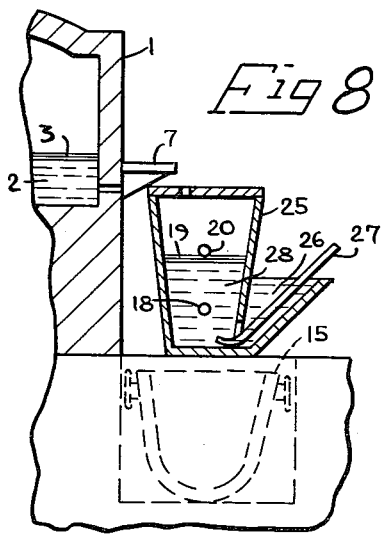
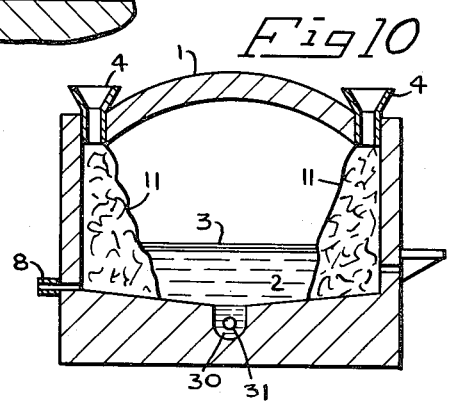
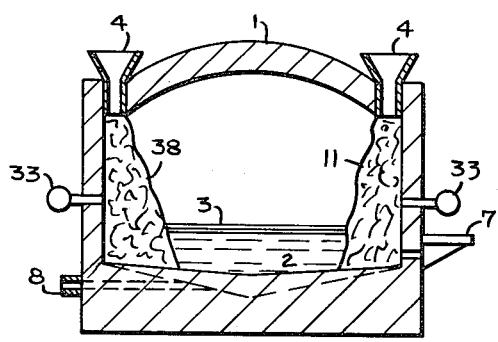
INVENTOR.
FRIEDRICH JOHANNSEN
BY
ATTORNEY

INVENTOR.
FRIEDRICH JOHANNSEN
BY

ATTORNEY

2,740,710

METHOD FOR THE PRODUCTION OF IRON, NICKEL, COBALT, MANGANESE, AND CHROMIUM FROM THEIR ORES

Friedrich Johannsen, Clausthal-Zellerfeld, Germany

Application February 19, 1952, Serial No. 272,446

Claims priority, application Germany March 2, 1951

2 Claims. (Cl. 75—133.5)

The invention relates to the production of iron, nickel, cobalt, manganese and chromium from their ores.

It is the main object of the invention to use a carbonized melt of these metals for the reduction of their ores in a reverberatory furnace.

With this object in view, a molten bath of these metals having a carbon content of 3 to 8 per cent is maintained in the reverberatory furnace at a temperature of about between 1200–1400° C. The ore is charged onto the metal melt at the one end of the furnace. By the reaction between the ore and the metal melt a slag layer is formed on the surface of the melt. This slag layer and the fresh ore charged at the one end of the furnace on the metal melt are passed over the surface of the same; during this passage the reduction takes place of the ore. The slag and the produced molten metal are discharged from the furnace.

A portion of the discharge metal may be enriched with carbon and returned into the furnace in order to make up the original carbonized metal melt.

In conformity with a further embodiment of the invention, the quantity of carbon required for the reduction of the ore is charged into the furnace with the fresh ore.

The process may be preferably performed in a continuous manner.

The invention will now be described in its application to the production of iron from iron ores and with reference to the accompanying drawings illustrating several preferred embodiments thereof.

In the drawings

Fig. 1 shows a longitudinal vertical section of a reverberatory furnace for the performance of the invention, the ore and the slag being unidirectionally conducted through the furnace;

Fig. 2 shows the same furnace for the conduct of the ore and the slag in opposite directions;

Figs. 3 and 4 show cross-sectional views of the furnace provided with a lateral and a central ore feed;

Figs. 5, 6, 7, 8 show cross-sectional views of an end portion of the furnace and of the devices for the recarbonization of the metal melt;

Fig. 9 shows a cross-section similar to Figs. 3, 4 of a modified construction of the furnace;

Figs. 10, 11, 12, 13 show cross-sections and appertaining partial longitudinal sections of further embodiment of the furnace.

In the drawings identical parts of the furnace are denoted with the same numerals.

Figure 11:
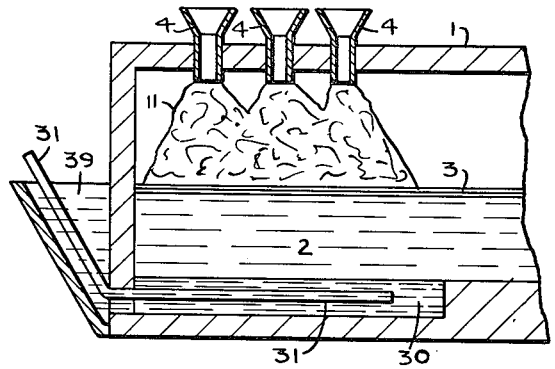

The invention will now be described with reference to the drawings and its application to the production of iron from oxidic iron ores. However, it is to be understood that the invention is equally successfully applicable to the production of nickel, cobalt, manganese and chromium from their ores.

As apparent from Figs. 1 and 2 the shape of the furnace 1 used for the purposes of this invention does not substantially vary from that of a normal reverberatory furnace.

The furnace is provided with charge supply tubes 4, which charge may consist of ore or mixtures thereof with fuel and other customary admixtures.

The furnace accommodates a carbonized iron melt, denoted with numeral 2 and a slag layer 3 carried on top of the iron melt 2.

A burner 5 is provided in the one end wall of the furnace for the introduction of fuel such as coal dust, oil or fuel gases.

The slag is discharged through tap hole 6 and the molten metal through spout 7. An additional metal discharge spout 8 is located beneath spout 7. The carbonized metal melt is entered through opening 9. The flue gases escape through passage 10.

The furnace is first charged with a carbonized iron melt having a carbon content of between 3 to 8 per cent; a quantity of about at least 1000 tons of crude iron is always maintained in the furnace; the oxidic iron ore is entered at a rate to form a slag layer of about 5 to 20 centimeters height. The iron melt should be maintained at a depth of about 1 meter.

The ore charged onto the melt is reduced by the carbon thereof and simultaneously the slag layer is formed. The slag is during its passage through the furnace gradually freed from iron by the reaction with the carbon of the iron melt and is intermittently or continuously discharged through tap hole 6.

The carbon monoxide produced by the reaction of the carbon containing melt 2 with the charged ore as well as with the oxidic slag is burned in the furnace, whereby a substantial part of the heat is produced which is required for the performance of the process. In addition thereto, the furnace is heated by burner 5.

In order to intensify the ore reduction, finely divided coal may be added to the ore. However, in most cases it is preferable to perform the reduction mainly by the carbon, which is dissolved in the pig iron bath 2; in this case, the introduction of sulfur into the furnace is substantially prevented; an acid low melting slag is preferably used.

The ore and the slag formed from the same may be conducted through the furnace in the same direction, as shown in Fig. 1, or in an opposite direction, as shown in Fig. 2.

It is recommendable to charge the ore at the side of the furnace where the burner 5 is located; in this manner the production of reducing gas takes place mainly at this side of the furnace and the heat of the reduction gases is fully utilized for the heating of the same.

The charge 11 may be supplied to the furnace laterally, as shown in Fig. 3 or centrally, as shown in Fig. 4. The furnace walls in the vicinity of the spouts are protected by water or air-cooled reinforcements 11a, Figs. 3, 4.

The recarbonization of the iron melt, which is removed from the furnace through tap holes 7, 8, is carried out in a reaction vessel 12 shown in Figs. 5, 6, 7, 8.

The iron is supplied to the movable coke-filled carbonization vessel, Fig. 5, either continuously or stepwise through tube 7. This vessel is lined with a refractory material and provided with a cover 13. An outlet 14 serves for the periodical discharge of the metal and for the introduction of air for heating purposes. A vat 15 located underneath vessel 12 is provided for the transport of the carbonized and heated iron melt to be charged into the furnace 1 through opening 9, Figs. 1, 2.

In order to bind sulfur lime or manganese ore or sodium compounds may be added to vessel 12. The carbonization may be effected by blowing coal through the iron bath in the vessel preferably together with air which may be supplied through nozzles 17, Fig. 6; whereby the carbonization vessel is heated. Fine lime, sodium carbonate or manganese ore may be added for desulfurization purposes.

The carbonized metal is removed through tap hole 18, Fig. 6 and the slag layer 19 covering the iron melt through tap hole 20.

The stationary carbonization vessel 21, Fig. 7, is provided with a charging hopper 22, air nozzles 23 and a tap hole 24 for the carbonized metal.

A molten lead bath 26, Fig. 8, may be provided at the bottom of the carbonization vessel 25. The carbonizing material is blown into the lead bath through steel tubes 27. Due to the pressure of the iron column 28 lead vaporization is greatly reduced; insofar as lead is vaporized it improves the desulfurization of the iron by the formation of lead sulfide. The slag 19 formed in the vessel may be discharged through tap hole 20. The metal is tapped from hole 18.

The carbonized iron is discharged from the carbonization vessels intermittently or continuously and then charged into the reverberatory furnace preferably at the side thereof opposite to the discharge side of the iron melt.

In certain cases, and particularly if fuel is used having a low sulfur content, it may be advisable to carry out the carbonization of the iron bath in the reverberatory furnace itself and to blow for this purpose fine fuel, oil, natural coal gas together with air or other customary slag forming admixtures into the iron bath.

A device for the accomplishment of these purposes is shown in Fig. 9, where tubes 29 are provided for this purpose, which tubes reach through the slag layer 3 into the iron melt 2.

In conformity with Figs. 10, 11 a lead filled bottom trough 30 is provided through which the tubes 31 pass for the introduction of air, powdered coal, oil or coal gas into the furnace 1. The lateral sump 39, Fig. 11, attached to a furnace wall and being in contact with trough 30 may be provided for the entrance of the tubes 31.

Figure 13:
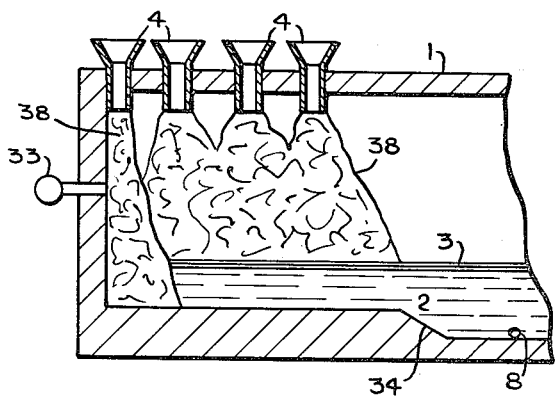

An embodiment of the furnace is illustrated in Figs. 12 and 13, which is provided with nozzles 33 entering the furnace through the side walls for the purpose to blow oxygen containing gases directly into the oxidic iron ore containing charge 38.

In conformity with Fig. 13, the bottom of the furnace is set off at 34.

Figures 14, 15:
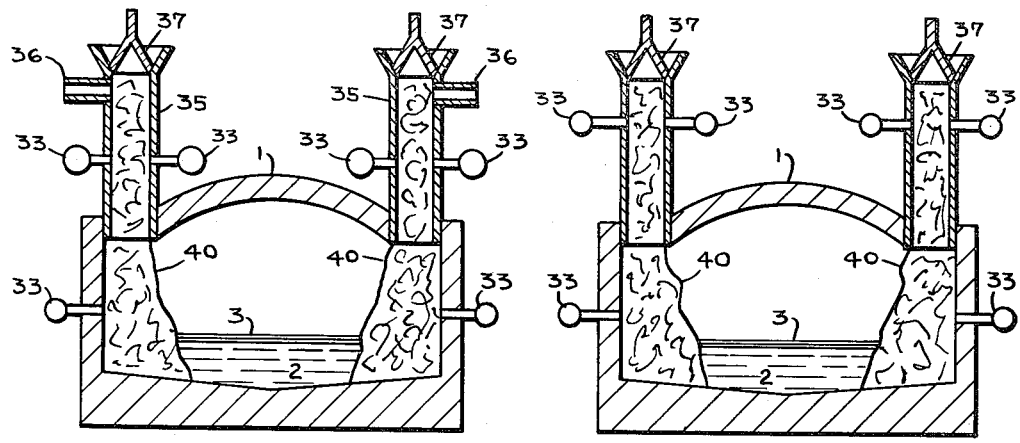
Figs. 14, 15 show cross-sections of the furnace provided with funnels or shafts for preheating the charge.

As shown in Figs. 14, 15 the furnace 1 is provided with charging chambers or shafts 35 located on top of the furnace for the introduction of the iron oxide containing charge, which in this case consists of briquettes 40 containing the iron ore, fuel and customary slag forming admixtures.

The gas is withdrawn from the furnace through tubes 36. The chambers are closed at the top with covers 37.

The chambers are provided with nozzles 33, as shown in Figs. 12, 13, with gas discharge flues 36 and with closure means 37.

The flue gases of the furnace which have a temperature of approximately 1200–1300° C. may be used for heating boilers and for the preheating of the combustion air.

If iron rich ore is used the total coal consumption will amount to between 400–800 kilograms per ton of crude iron, whereby about 5 kilograms of steam may be recovered from the flue gases per one kilogram of coal. The ore may be used in lumps or in the form of a fine concentrate and does not need to be sintered.

In conformity with a further modification of the invention a mixture of metal oxides with carbon is charged onto the metal melt, the admixture of the carbon being controlled in such a manner that the carbon content of the metal melt enables the final reduction of the slag without admixture of a carbon enriched alloy. This purpose can be satisfactorily attained by the admixture of about 30 per cent carbon to the oxidic ore. In this case, it is advisable to briquette the mixture of the metal oxides and the carbon; the formation of the fluid slag will take place at a higher temperature and a longer period and a higher temperature is available for the carbonization of the reduced metal.

The process forming the subject matter of this invention will now be described with reference to the following examples.

*Example 1*

A reverberatory furnace, as described in Fig. 4, is used for a daily charge of 1430 tons of hematitic iron ore having 67.6 per cent iron. The furnace produces 1000 tons crude iron and 60 tons slag. The ore is preheated by flue gas to about 500° C. and lime is added through tubes 4.

The reduction of the iron ore is solely effected by the carbon of the crude iron melt 2, which is added having a temperature of 1400° C. and a carbon content of 5.3 per cent.

The iron is conducted in counter-current to the ore and to the slag layer 3; during the passage through the furnace 1 the carbon of the iron melt is reduced to 2.5 per cent. The iron is continuously discharged through outlets 7 or 8.

For the production of one ton of iron 144 kilograms of coal having 8000 K cal./kg. are required and are burned by admixture of air which is preheated to 1100° C.

Nine tons of the iron melt are circulating through the furnace for the production of one ton of crude iron. Upon discharge from the furnace, these nine tons of the iron melt are alternatively recarbonized in two carbonizing chambers 21, as shown in Fig. 7. These chambers are operated with air preheated to 600° C.; the melt is recarbonized to 5.3 per cent C and heated to 1450° C. to make up for heat losses during the transport from the chamber into the furnace 1.

The coke requirement of the two recarbonizing chambers 21 including that required for the formation of a desulfurizing slag in 356 kilograms producing 7100 K cal./kg. The flue gases of these furnaces are used to preheat the air to 600° C.

If ore is treated having a low content of sulfur, the sulfur contents of the crude iron in the furnace will only be 0.04 per cent; the sulfur of the coke in the recarbonizing furnace is bound by means of a slag containing manganese, lime and sodium carbonate. The total consumption of lime and sodium carbonate per ton of crude iron is 5.1 and 3.3 kilograms, respectively.

*Example 2*

A daily charge consisting of 1000 tons of an oxidic iron ore concentrate with 61.8 per cent Fe, of 50 tons lime briquetted with 300 tons coal are treated in accordance with the invention in a furnace which is charged as shown in Figs. 12 and 13 and operated as apparent from Fig. 1.

The amount of heating coal per one ton of crude iron is 48 kilograms. The flue gases of the furnace having a temperature of 1200° C. are used to preheat the briquettes to 300° C. and the air to 500° C.

The crude iron taken from the furnace for recarbonization has a temperature of 1250° C. and 0.23 per cent S. The iron is recarbonized and desulfurized in a vessel shown in Fig. 8 and provided with a lead sump by blowing into the vessel, air, coal dust and sodium carbonate; a temperature of 1450° C. is maintained in the vessel. 38 kilograms of coal dust and 7.7 kilograms of sodium carbonate are used per one ton of crude iron and the total consumption of coal is 565 kilograms per ton of crude iron.

800 tons of coarse ilmenite ore having 41 per cent Fe and 40 per cent TiO₂ are treated in a reverberatory furnace having a 250 square meter hearth with 660 tons sodium carbonate, whereby a sodium titanate slag results.

The ore which is preheated to 300° C. is charged into a furnace, as shown in Figs. 1 and 3; the lateral introduction of the ore protects the furnace lining against attack by free sodium carbonate. Sodium carbonate, air and a portion of the coal are blown into the iron melt through the lead bath as shown in Figs. 10 and 11, in order to prevent dusting of the fine sodium carbonate and corresponding wear of the furnace lining.

The blown-in sodium carbonate desulfurizes the crude iron melt; desulfurization and recarbonization in a carbonizing vessel are therefore not required in this case.

The crude iron having 4 percent C and a temperature of 1250° C. is periodically tapped through spout 8, since the hourly production of 13.5 tons does not warrant a continuous discharge through tap hole 7. The sodium titanate slag flows continuously from the furnace through spout 6.

The total consumption of coal is 795 kilograms per ton of crude iron, of which a part is blown into the lead sump and the other part entered through burner 5, Fig. 1. The amount of slag per ton of iron is 2140 kilograms.

The waste gases are partly used to preheat the combustion air to 600° C. and the ore to 300° C.

*Example 4*

1000 tons of a fine grain manganese containing sparry iron ore are briquetted with 220 tons burnt lime and 300 tons fine coal and treated in a furnace shown in Fig. 14 provided with preheating shafts 35. The furnace is heated with coal dust and air which is preheated to 200° C. The sparry iron ore contains 31.6 per cent Fe, 6.5 percent Mn, 13 per cent SiO₂.

The air is blown through nozzles 33 into the preheaters 35, Fig. 14; the produced carbonic acid containing gases having a temperature of 600° C. are removed through tubes 36. A desulfurization in a separate vessel is not required, since the lime and the manganese containing slag acts as a sulfur remover.

The sulfur poor crude iron having a temperature of 1300° C. is periodically tapped; it contains 81 per cent Fe, 14.3 per cent Mn, 4 per cent C.

*Example 5*

1300 tons of moist brown iron ore having a grain size of up to 50 millimeters and having 27.0 per cent Fe, 28 per cent SiO₂, 8.5 per cent Al₂O₃, 8.02 per cent CaO, 0.42 per cent P are preheated to 200° C., mixed with 110 tons of burnt lime and 103 tons of coal and charged through opening 3 into a furnace, shown in Fig. 1, having a hearth surface of 250 square meters and containing a crude iron melt with 5.5 per cent C. The reduction of the ore is carried out by blowing a coal dust flame into the furnace through tube 5.

262 kilograms of crude iron containing 94.5 per cent Fe, 1.5 per cent P, 4.0 per cent C and 0.13 per cent S and 625 kilograms slag containing 48 per cent SiO₂, 15.2 per cent Al₂O₃, 27 per cent CaO and 4 per cent FeO are produced.

The crude iron having a temperature of 1300° C. is stepwise or continuously run into the desulfurizing vessel shown in Fig. 6, into which air and sodium carbonate are blown through the nozzles 17.

The carbon is reduced to 30 per cent, the sulfur to 0.04 per cent; the temperature was maintained at 1350° C.

The fuel consumption per ton of crude iron was 760 kilograms, the slag production 2370 kilograms, the consumption of lime 324 kilograms, the sodium carbonate consumption 3 kilograms and the current consumption 485 kw.

Since certain changes in carrying out the above process could be made without departing from the scope thereof, it is intended that all matter contained in the above description or shown in the accompanying drawing shall be interpreted as illustrative and not in a limiting sense.

Having thus described the invention, what I claim as new and desire to be secured by Letters Patent, is as follows:

1. A method for the reduction of oxidic iron ores and particularly ores containing oxides of nickel, cobalt, chromium, manganese, by the action of a carbon rich iron alloy in a reververatory furnace, the ore being charged at the one end of the furnace, the formed slag being discharged at the other end thereof and the slag being passed through the furnace as a thin layer over the underlying bath of the carbon rich iron alloy comprising charging a mixture of the oxidic ore and of the carbon required for its reduction onto said iron bath in the form of briquettes and blowing the oxygen containing gases required for the combustion of the reduction gases through the briquette layer into the furnace.

2. A method for the reduction of oxidic iron ores and particularly ores containing oxides of nickel, cobalt, chromium, manganese, in a reverberator furnace comprising maintaining in said furnace a molten iron bath having a carbon content of between 3 to 8 per cent, charging a mixture of said oxidic ore and the carbon required for its reduction in the form of briquettes onto said iron bath at the one end of said furnace, whereby a slag layer is produced on the surface thereof, passing the briquettes charged upon said slag layer on the metal bath towards the opposite end of the furnace, whereby a reduction is effected of the briquettes, blowing the oxygen containing gases required for the combustion of the reduction gases through the briquette layer into the furnace.

References Cited in the file of this patent

UNITED STATES PATENTS

| | | |
|---|---|---|
| 608,779 | Karyscheff | Aug. 19, 1898 |
| 1,300,410 | Johnson | Apr. 15, 1919 |
| 1,691,272 | Flodin | Nov. 13, 1928 |
| 1,815,946 | Langer | July 28, 1931 |
| 1,920,377 | Greene | Aug. 1, 1933 |